Feb. 22, 1949.  S. L. CASELLA  2,462,465
CHUCK FOR LATHES AND THE LIKE MACHINE TOOLS
Filed Sept. 12, 1947  3 Sheets-Sheet 1

INVENTOR
SECONDO L. CASELLA
BY: J.B. Felshin
ATTORNEY

Feb. 22, 1949.   S. L. CASELLA   2,462,465
CHUCK FOR LATHES AND THE LIKE MACHINE TOOLS
Filed Sept. 12, 1947   3 Sheets-Sheet 3

INVENTOR
SECONDO L. CASELLA
BY: J.B. Felshin
ATTORNEY

Patented Feb. 22, 1949

2,462,465

UNITED STATES PATENT OFFICE 2,462,465

CHUCK FOR LATHES AND THE LIKE MACHINE TOOLS

Secondo L. Casella, New York, N. Y., assignor to Morey Machinery Co. Inc., Astoria, Long Island, N. Y., a corporation Application September 12, 1947, Serial No. 773,660

7 Claims. (Cl. 279—2)

This invention relates to chucks for lathes and the like machine tools.

An object of this invention is to provide an improved chuck of the character described for chucking annular ringlike work pieces, including a plurality of radial chucking elements and means for causing said elements to simultaneously grip the work piece for turning operation and for simultaneously releasing the work piece so that it may be easily removed from the chuck.

Another object of this invention is to provide a chuck of the character described including a plurality of radial chucking elements, and means for simultaneously moving the chucking elements either radially outwardly to grip the work piece or radially inwardly to release the work piece.

In present chucking devices for chucking ringlike work pieces, a horseshoe shaped ring washer is employed, and it must be manually set in place and removed for each chucking operation. It is, therefore, still another object of this invention to provide an improved chucking device of the character described, wherein the necessity for a horseshoe ring washer is eliminated, the chucking operation being automatic and the unchucking or releasing operation likewise being automatic.

Yet another object of this invention is to provide a strong, rugged and durable chucking device of the character described which shall be relatively inexpensive to manufacture, which shall be smooth and positive in operation and practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown various possible illustrative embodiments of this invention, Fig. 1 is an elevational, cross-sectional view illustrating the chuck embodying the invention;

Figure 1:
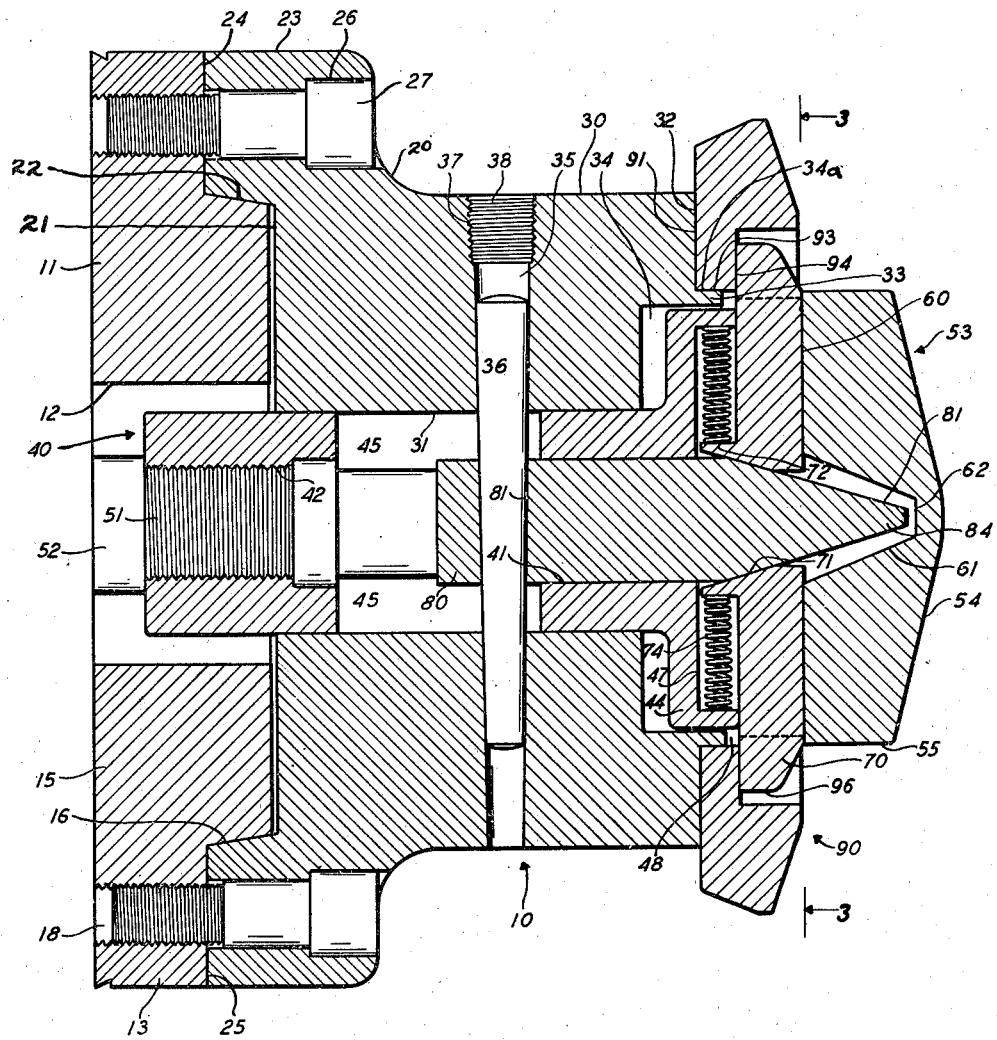
Figure 2:
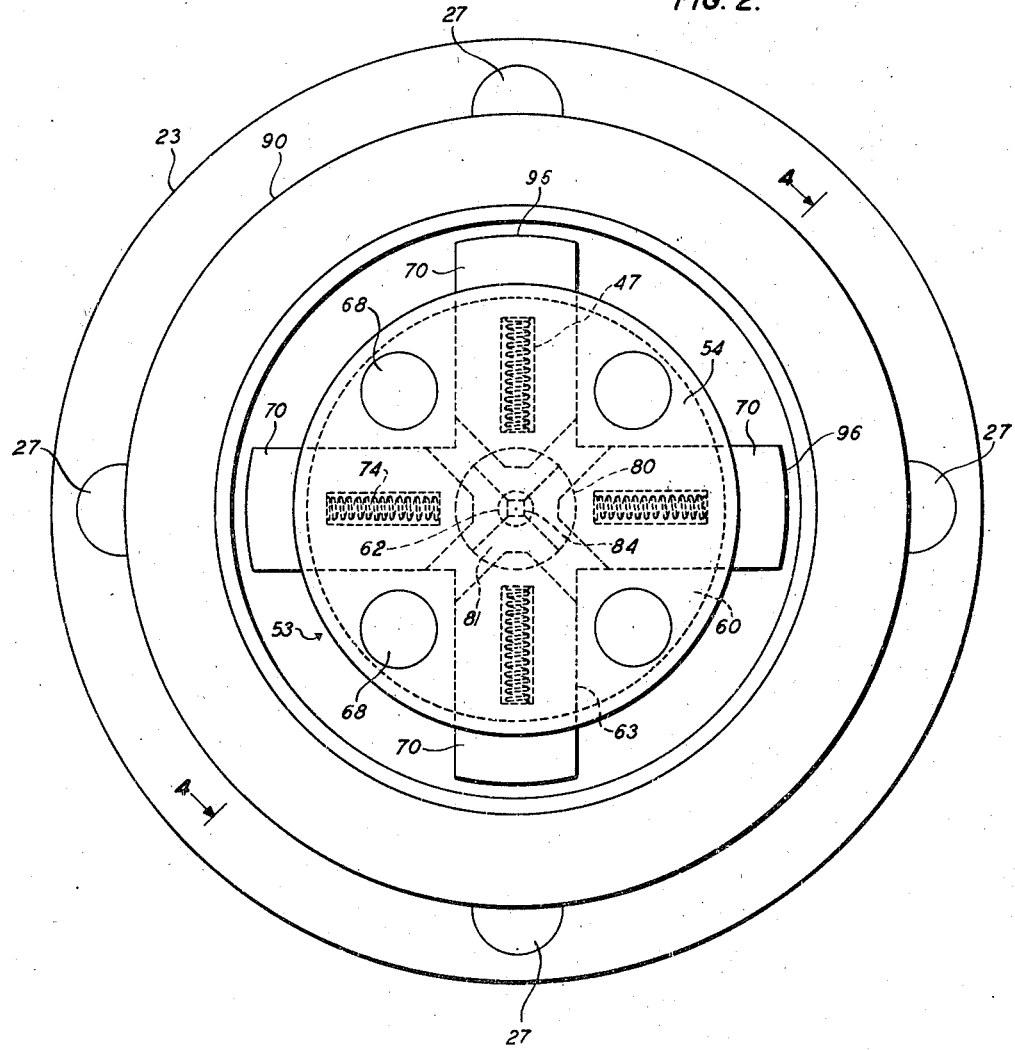
Fig. 2 is a front elevational view thereof.
Figure 3:
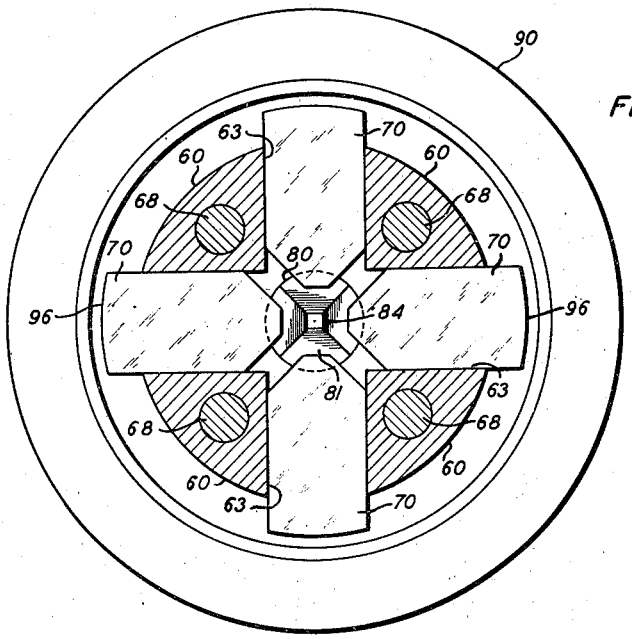
Fig. 3 is a cross-sectional view taken on line 3—3 of Fig. 1.
Figure 4:
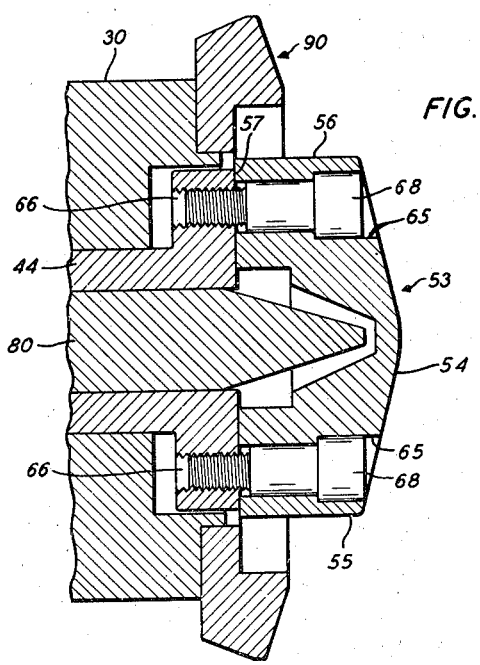
Fig. 4 is a cross-sectional view taken on line 4—4 of Fig. 2.

Referring now in detail to the drawing, 10 designates a chucking device embodying the invention for a lathe or similar machine tool. The same comprises the front end 11 of a spindle, such as a lathe spindle. Spindle 11 is annular and is formed with a central bore 12. It is, furthermore, formed with an annular outwardly extending flange 13 and with a forwardly projecting annular portion 15 having an outer tapered surface 16. The annular flange 13 is formed with a plurality of screw threaded parallel openings 18. Attached to the spindle 11 is a spindle nose 20.

The nose 20 is formed at its rear surface with a socket 21 to receive the projection 15. Said socket has an inner tapered surface 22 to contact the surface 16 of projection 15. Said nose is furthermore formed at its rear end with an annular outwardly extending flange 23, the rear surface 24 of which contacts the front surface 25 of flange 13. Said flange 23 is formed with a plurality of countersunk through openings 26 to receive bolts 27 for attaching the spindle nose 20 to the spindle 11. The shanks of the bolts 27 are, of course, threaded within the screw threaded openings 18 of the spindle. The spindle nose 20 has an outer annular surface 30 of less diameter than the outer diameter of the flange 23.

Said nose is, furthermore, formed with an axial through opening 31. It is furthermore formed with a front surface 32 extending to surface 30. Projecting forwardly from surface 32 is an annular projection 33 formed with an outer annular surface 34a. The nose 20 is formed with a counter-bored socket 34 in its front face communicating with the axial through opening 31. Said nose is furthermore formed with a diametrical tapered through opening 35 for a tapered pin 36. The opening 35 traverses the axial bore 31, and the tapered pin 36 therefore likewise traverses said axial bore, for the purpose hereinafter appearing.

The upper end of opening 35 may be threaded, as at 37, to receive a plug 38 to plug the thicker end of the opening. Slidably mounted within bore 31 is a sleeve 40 formed with an axial through opening 41. The rear end of through opening 41 is threaded, as at 42, and reduced in diameter. The sleeve 40 is formed at its front end with an annular flange 44, which is received in the counterbore or socket 34 of the nose piece 20. The shank of the sleeve is formed with parallel, diametrically opposed slots 45, communicating with the axial bore 41, through which the tapered pin 36 passes. Sleeve 40 may thus slide axially relative to the nose piece, but will rotate therewith.

Flange 44 has a front face 46. Said front face is formed with a plurality of radiating slots 47, communicating at their inner ends with the bore 41, but terminating short of the outer surface 48 of the flange, thereby forming at the outer end of each slot, a shoulder 50. Screwed to the threaded opening 42 is a threaded stem 51 of a drawrod 52, which may be connected to any hydraulic or pneumatic cylinder or to any other operating mechanism which will reciprocate the sleeve 40.

As will appear hereinafter, when the rod 52 moves to the left, sleeve 40 will be slidably moved to the left, and when the draw rod 52 is moved to the right, sleeve 40 will be moved to the right, for the purpose hereinafter appearing.

Attached to the front face 46 of sleeve 40, is a cap 53. Said cap 53 has a conical front surface 54 and an outer cylindrical surface 55 of somewhat less diameter than the outer surface 34a of flange 33. Said cap is furthermore formed with an annular surface 56 of a diameter substantially equal to the diameter of surface 48 of flange 44. Said cap is furthermore formed with a rear surface 57, which contacts the front surface 46 of the sleeve 40.

It will be noted that four slots 47 are shown for the purpose of illustration. Likewise the rear portion of the cap 53 is formed with four radial slots 60 extending to the outer surface 56 of the cap. The slots 60 meet at the center of the cap. The cap is counterbored at its inner side forming a tapered opening 61 with a flat end surface 62. The tapered opening 61 communicates with the opening formed at the junction of the four slots 60. The slots 60 are of rectangular cross-section, each having side surfaces 63.

The cap is furthermore formed with counterbored through openings 65 equiangularly spaced between the slots 60. The flange 44 is formed with through screw threaded openings 66 registering with the counterbored openings 65 to receive bolts 68 extending through the openings 65 and screwed into the openings 66 for attaching the cap 53 to the front end of the sleeve 40.

Slidably mounted and fitted within in each of the slots 60 is a radial chucking or gripping element 70. Each member 70 is of rectangular cross-section and has side surfaces contacting surfaces 63 of the slot 60. It is also formed at its inner end with a flat tapered surface 71, for the purpose hereinafter appearing. It is also formed with a rearward projection 72 projecting into one of the slots 47. Between the projections 72 and the shoulders 50 are coil compression springs 74, normally tending to pull the chucking element 70 radially inwardly.

Means is provided for moving the chucking or gripping element radially outwardly. To this end, there is disposed within the bore 41 of sleeve 40, a cam pin 80. The cam pin 80 is formed with a diametric tapered opening 81 through which the tapered pin 36 passes, so that the cam pin 80 rotates with the spindle nose 20, but does not move axially thereof. At the forward end of pin 80 are four flat inclined similar cam surfaces 81' contacting the inclined surfaces 71 of chucking elements 70. The front end 84 of the cam pin 80 projects into the conical opening 61 in the cap.

It will now be understood that when the sleeve 40 is moved to the right, cap 53 and the chucking element 70 move to the right therewith, while cam pin 80 does not move axially. During such movement, the chucking element 70 will move radially inwardly relative to the axis of the chuck and away from flange 33, under the influence of spring 74. Said chucking elements will ride down the inclined surfaces 81. Such movement will release a work piece 90 in the chuck.

The work piece 90 is shown for the purpose of illustration. It is annular or ring shaped. It has a surface 91 which contacts surface 32 of the spindle nose. It may also have an inner peripheral surface 93 centered on the outer peripheral surface 34a of flange 33. Obviously, if the central opening in the work piece is of greater diameter than the diameter of surface 34a, shim rings may be interposed between surface 34a and the inner surface 93 of the work piece. The work piece 90 also has a surface 94 which may be engaged by the inner surfaces 95 of the chucking elements 70 when the chuck is moved to chucking position. When the chucking elements are in releasing position, their outer ends 96 must be located inwardly of surface 34a so that the work piece may be slipped onto said surface. The sleeve 40 is then moved to the left looking at Fig. 1 of the drawing, whereby moving the cap 53 together with the chucking element 70 likewise to the left, causing surfaces 71 of the chucking elements to ride up on surfaces 81, thereby moving the chucking elements radially outwardly and compressing the spring 74. At the same time the chucking elements will move toward and against surface 94 of the work piece, so as to tightly grip the same and to press the work piece against surface 32 of the nose of the spindle.

It will now be understood that the chucking operation or the releasing operation is done automatically without necessity for any horseshoe washers or any other manual manipulation. The movement of the sleeve 40 to the right or the left may be controlled by the draw rod 52, which may be connected to either a hydraulic or pneumatic cylinder or to any other suitable operating means.

The chucky elements thus move radially outwardly and also in an axial direction toward the work piece to chuck the same. The chucking elements move radially inwardly and at the same time axially away from the work piece to release the same.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. A chuck comprising a spindle nose adapted to be attached to a lathe spindle, a sleeve mounted therein for rotation therewith and sliding movement relative thereto, a cam pin disposed within the sleeve, means to attach the cam pin to the spindle nose for rotation therewith and to prevent axial movement of the cam pin relative to the spindle nose, said cam pin being formed with cam surfaces at one end, and chucking elements mounted for radial sliding movement relative to said sleeve, and for axial movement together with said sleeve, and having cam surfaces engaging the cam surfaces on the cam pin so that sliding movement of the sleeve relative to the cam pin will cause radial movement of the chucking elements and movement of said chucking elements longitudinally of the axis of said spindle nose.

2. In combination, a spindle nose formed with an axial through opening, said spindle nose being formed at its front and with a counterbored opening communicating with the through opening, said spindle nose being furthermore formed with an annular flange projecting from the front face thereof, and surrounding said counterbored opening, a sleeve slidably mounted within the through opening in the nose, said sleeve being provided with an outwardly extending annular flange disposed within said counterbore, the front face of said flange being formed with radial slots extending to an axial through opening in the sleeve and terminating short of the outer periphery of the flange forming shoulders, said sleeve being formed with parallel diametrically opposed slots, a pin passing through the spindle nose and through said slots, a cam pin within the axial opening in the sleeve, said pin passing through said cam pin, the front end of the cam pin having a plurality of tapered surfaces, a cap attached to the front face of the flange of the sleeve, chucking elements slidably mounted between the cap and the flange for radial movement, said chucking elements having projections projecting into the slots, and coil compression springs within the slots interposed between said projections and shoulders.

3. In combination, a spindle nose formed with an axial through opening, a sleeve slidably mounted within said through opening, means to reciprocate said sleeve relative to said spindle nose, means to cause said sleeve to rotate with said nose, chucking elements mounted for radial movement relative to said sleeve, and axial movement with said sleeve, and cam means fixed to said spindle nose for moving said chucking elements radially outwardly upon moving said sleeve axially of said spindle nose in one direction.

4. In combination, a spindle nose formed with an axial through opening, a sleeve slidably mounted within said through opening, means to reciprocate said sleeve relative to said spindle nose, means to cause said sleeve to rotate with said nose, chucking elements mounted for radial movement relative to said sleeve, and axial movement with said sleeve, cam means fixed to said spindle nose for moving said chucking elements radially outwardly upon moving said sleeve axially of said spindle nose in one direction, and spring means for moving said chucking elements radially inwardly upon moving said sleeve axially of said spindle nose in an opposite direction.

5. A chucking device comprising a spindle nose, cam means mounted for non-sliding movement relative to said nose and for rotation with said nose, a member mounted for sliding movement relative to the axis of said nose and for rotation with said nose about its axis, chucking elements mounted for radial movement relative to said member, and for movement with said member axially of the nose, said chucking elements engaging said cam means whereby movement of said member in one direction axially of the nose will move said chucking elements radially outwardly relative to the axis of the spindle nose and axially of said spindle nose toward said nose.

6. A chucking device comprising a spindle nose, cam means mounted for non-sliding movement relative to said nose and for rotation with said nose, a member mounted for sliding movement relative to the axis of said nose and for rotation with said nose about its axis, chucking elements mounted for radial movement relative to said member, and for movement with said member axially of the nose, said chucking elements engaging said cam means whereby movement of said member in one direction axially of the nose will move said chucking elements radially outwardly relative to the axis of the spindle nose and axially of said spindle nose toward said nose, means for moving said chucking elements radially inwardly upon movement of said member in an opposite direction, to move said chucking elements axially away from the spindle nose, and means on the spindle nose adapted to support a ringlike work piece adapted to be gripped by the chucking elements in one position thereof.

7. A chucking device comprising a spindle nose, cam means mounted for non-sliding movement relative to said nose and for rotation with said nose, a member mounted for sliding movement relative to the axis of said nose and for rotation with said nose about its axis, chucking elements mounted for radial movement relative to said member, and for movement with said member axially of the nose, said chucking elements engaging said cam means whereby movement of said member in one direction axially of the nose will move said chucking elements radially outwardly relative to the axis of the spindle nose and axially of said spindle nose toward said nose, means for moving said chucking elements radially inwardly upon movement of said member in an opposite direction, to move said chucking elements axially away from the spindle nose, means on the spindle nose adapted to support a ringlike work piece adapted to be gripped by the chucking elements in one position thereof, and means for reciprocating said member relative to said nose.

SECONDO L. CASELLA.

REFERENCES CITED

The following references are of record in the file of this patent:

UNITED STATES PATENTS

| Number | Name | Date |
| --- | --- | --- |
| 403,529 | Gay | May 21, 1889 |
| 1,235,957 | Bidwell | Aug. 7, 1917 |
| 1,359,992 | Hook | Nov. 23, 1920 |
| 1,527,866 | Hall | Feb. 24, 1925 |
| 1,708,228 | Lovely | Apr. 9, 1929 |